United States Patent [19]

Beaudette et al.

[11] 4,285,572
[45] Aug. 25, 1981

[54] OPTICAL CABLE CONNECTOR FOR CONNECTING AN OPTICAL FIBER WITH A PHOTODIODE

[75] Inventors: Richard A. Beaudette, Tewksbury; John A. Gonsalves, Woburn, both of Mass.

[73] Assignee: GTE Laboratories Incorporated, Waltham, Mass.

[21] Appl. No.: 134,366

[22] Filed: Mar. 27, 1980

[51] Int. Cl.³ .............................................. G02B 7/26
[52] U.S. Cl. .............................. 350/96.20; 250/552; 357/17; 357/74
[58] Field of Search ............... 350/96.20, 96.21, 96.22; 250/227, 552; 357/17, 18, 30, 74

[56] References Cited

U.S. PATENT DOCUMENTS

| 4,075,477 | 2/1978 | Hanson | 250/227 |
| 4,081,208 | 3/1978 | Meade | 350/96.20 |
| 4,118,105 | 10/1978 | Voigt | 350/96.20 |
| 4,179,801 | 12/1979 | Hollis | 350/96.20 X |
| 4,186,996 | 2/1980 | Bowen et al. | 350/96.20 |

FOREIGN PATENT DOCUMENTS

| 8979 | 3/1980 | European Pat. Off. | 350/96.20 |
| 1456394 | 11/1976 | United Kingdom | 350/96.21 |

OTHER PUBLICATIONS

"AMP Optimate Connector for Active Devices", AMP Data Sheet 79-526, Apr. 1979, 2 pp.

*Primary Examiner*—John D. Lee
*Attorney, Agent, or Firm*—Fred Fisher

[57] ABSTRACT

An optical cable connector includes a fiber connector plug and a mating connector receptacle.

The plug, which receives an assembly including sheath and optical fiber, includes a generally cylindrical optical pin, a copression spring, a spring retainer nut, and a pin housing.

The mating connector receptacle includes a housing, a circular shim, a photodiode housing assembly, and a retainer cap.

2 Claims, 4 Drawing Figures

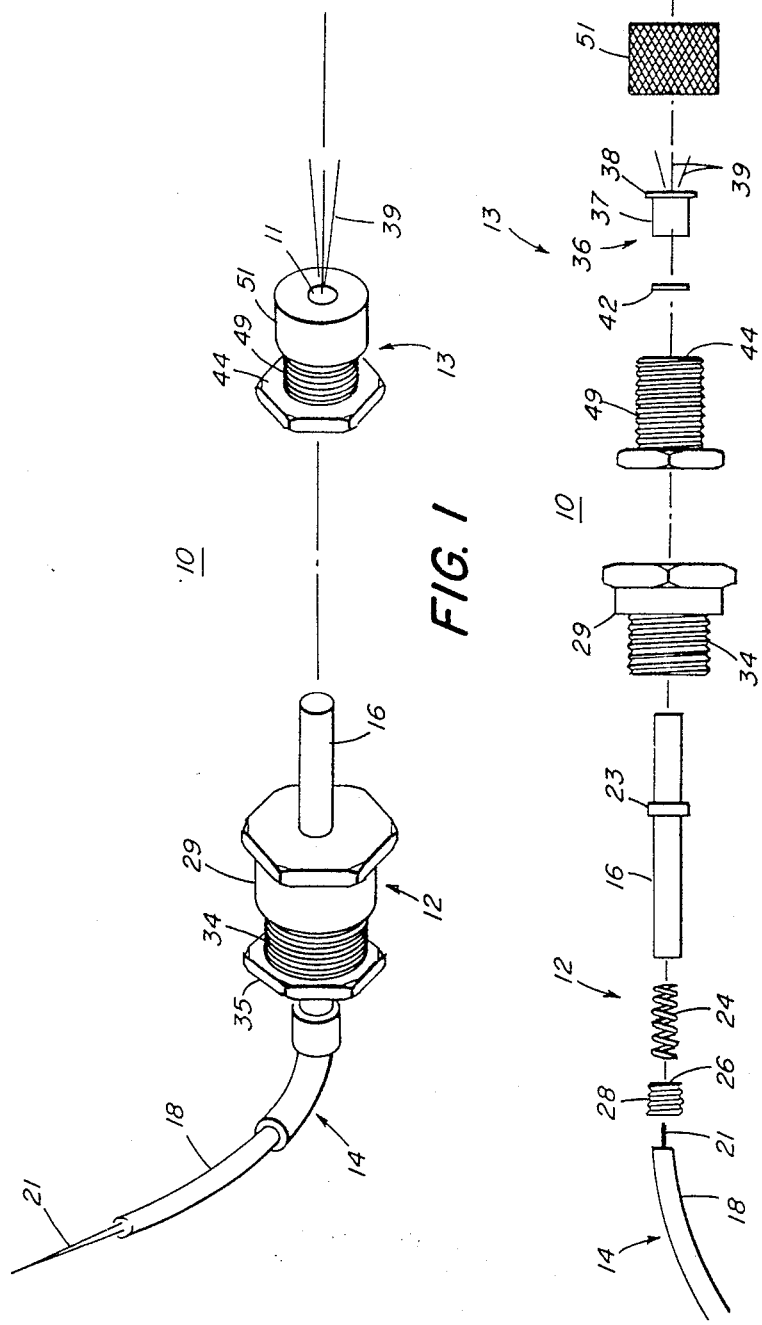

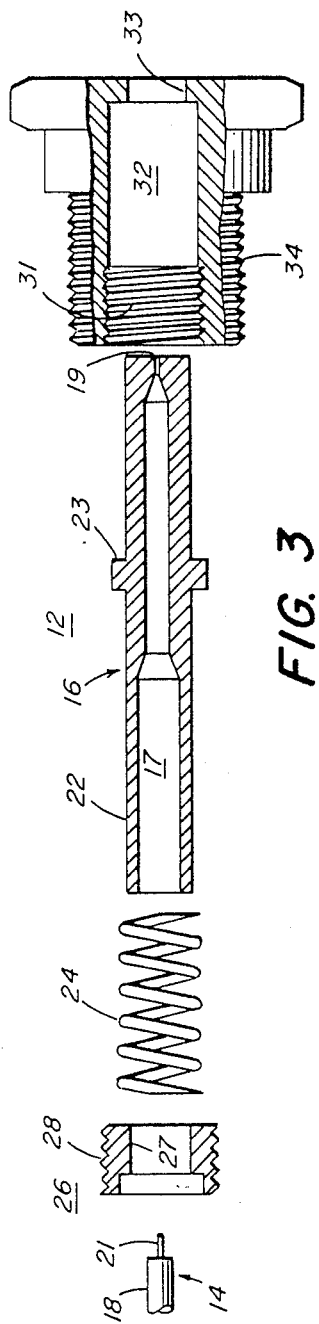
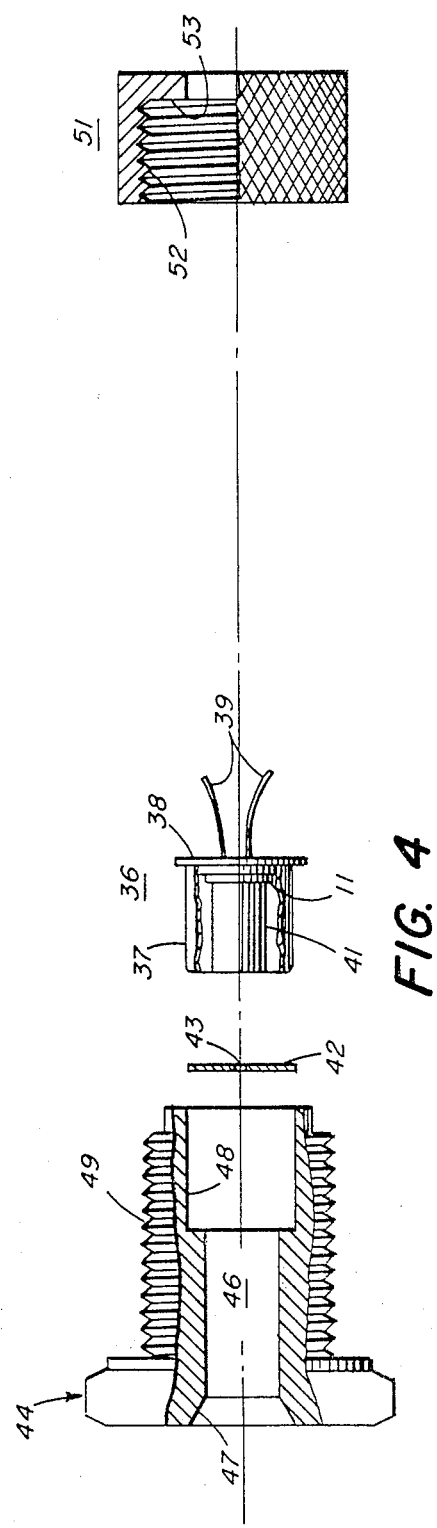
FIG. 3
FIG. 4

OPTICAL CABLE CONNECTOR FOR CONNECTING AN OPTICAL FIBER WITH A PHOTODIODE

BACKGROUND OF THE INVENTION

1. Field of the Invention

This invention relates to optical cable connectors and, in particular, to push-on type optical cable connectors, suitable for printed circuit card to back plane rack connection for small fibers. Accordingly, it is the general object of this invention to provide new and improved connectors of such character.

2. Description of the Prior Art

Connectors for fiber optic cable utilizing plastic and large diameter glass fibers or fiber bundles are commercially available. Several fiber-to-fiber connectors for small fibers, having cores in the range of 63 to 100 micrometers, have been used in long line telephone communications.

One known push-on connector for small diameter field cable has been fabricated for a test bed installed in Europe. The connector is not available for general use, having been designed for fiber-to-fiber application with bulky construction not practical for printed circuit card applications. Its losses are on the order of one to three decibels of attenuation with high sensitivity to mechanical interference.

SUMMARY OF THE INVENTION

Another object of this invention is to provide for a new and improved fiber optic cable suitable for practical field application for use with printed circuit card to back plane rack connection of small fibers.

Yet another object of this invention is to provide for a new and improved fiber optic connector having connection repeatability to within a few tenths of a decibel, which is rugged, and which is simple to fabricate.

Still another object of this invention is to provide for a new and improved fiber optic connector having a photodetector as an integral part thereof.

Still yet another object of this invention is to provide for a new and improved fiber optic connector in which a connection of the optical fiber to a photodiode is achieved with a consistent loss of less than one-half decibel.

Still another object of this invention is to provide for a new and improved fiber optic connector which is relatively insensitive to fiber alignment.

Another object of this invention is to provide for a new and improved fiber optic connector including an integral photodetector for application to a push-in printed circuit board.

In accordance with a preferred embodiment of the invention, an optical cable connector includes a fiber connector plug which is adapted to receive an optical fiber. The plug has a spring loaded pin. A mating connector receptacle has a photodiode contained therewithin so that the receptacle is mated to the plug as they are engaged, wherein the pin reaches its seat in the receptacle slightly before the receptacle is fully seated so that the pin spring remains under load.

In accordance with another embodiment of the invention, an optical cable connector includes a fiber connector plug which is adapted to receive an optical fiber and has a spring loaded pin, the plug being adapted to be normally mounted at the rear of a rack which can accept a printed circuit card. A mating connector receptacle includes a photodiode contained therewithin, the receptacle being adapted to be normally mounted on the printed circuit card.

In accordance with still another embodiment of the invention, an optical cable connector includes a fiber connector plug adapted to receive an optical fiber assembly including sheath and fiber, and a mating connector receptacle having a photodiode contained therewithin. The fiber connector plug includes a generally cylindrical optical pin having an axial passageway including a large diameter portion for receiving the fiber assembly and a small diameter portion for receiving the fiber. The pin has a circumference of a nominal outer diameter with a medial circular flange. The connector plug further includes a compression spring having an inner diameter large enough to receive the optical pin circumference of nominal outer diameter but the inner diameter is smaller than the flange. The plug further includes a spring retainer nut having an inner passageway with an inner diameter greater than the nominal outer diameter but smaller than the flange. The nut has an external male thread. The plug further includes an optical pin housing assembly having an axial passageway. The axial passageway has a first end portion characterized by an internal female thread adapted to engage with the external male thread of the spring retainer nut. A medial portion is large enough to receive the optical pin including its medial flange for axial reciprocation therewithin, and an opposing end portion has a diameter barely larger than the nominal outer diameter but smaller than the medial circular flange. Thus, the receptacle is mated to the plug as they are engaged wherein the pin reaches its seat in the receptacle slightly before the receptacle is fully seated so that the compression spring remains under load. In accordance with certain features of the invention, the optical pin housing assembly has an external configuration suitable for affixation to a rack for a printed circuit card. In accordance with still other features of the invention, the mating connector receptacle includes a housing having an outer cylindrical shell, a flanged base, a photodiode chip affixed to the base, electrical leads extending through the base to the chip, and a transparent light pipe affixed to the chip and extending axially with the shell. The light pipe has a diameter substantially larger than the diameter of the fiber. The receptacle further includes a circular shim having a central hole and also includes a photodiode housing assembly having an axial passageway including a medial portion large enough so that the nominal outer diameter portion of the pin can reciprocate therewithin. A first tapered end portion engages the medial portion, and an opposing larger end portion receives the shim and a substantial portion of the outer cylindrical shell of the housing but not the flange base. The photodiode housing has an outer thread. The mating connector receptacle further includes a retainer cap having an inner thread adapted to engage with the outer thread of the photodiode housing assembly and has an inner portion adapted to engage the flanged base of the housing. In accordance with another feature of the invention, the light pipe has a diameter four times larger than the diameter of the fiber. In accordance with still other features of the invention, the shim has an outer diameter larger than the nominal outer diameter and the central hole is smaller than the nominal outer diameter but is larger than the small diameter portion.

In accordance with still yet another embodiment of the invention, a connector receptacle for an optical fiber connection plug, wherein the receptacle is adapted for use with a printed circuit board, includes a housing having an outer cylindrical shell, a flanged base, a photodiode chip affixed to the base, electrical leads extending through the base to the chip, and a transparent light pipe affixed to the chip and extending axially with the shell, the light pipe having a diameter substantially larger than the diameter of optical fiber to be used. The receptacle further includes a circular shim having a central hole and further includes a photodiode housing assembly having an axial passageway including a medial portion large enough so that a spring biased optical pin can reciprocate therewithin, a first tapered end portion being in engagement with the medial portion, and an opposing larger end portion receiving the shim and a substantial portion of the outer cylindrical shell of the housing but not the flanged base. The photodiode housing assembly has an outer thread. The connector receptacle further includes a retainer cup having an inner thread adapted to engage with the outer thread of the photodiode housing assembly and has an inner portion adapted to engage the flanged base of the housing.

BRIEF DESCRIPTION OF THE DRAWING

Other objects, advantages, and features of this invention, together with its construction and mode of operation, will become more apparent from the following description, when read in conjunction with the accompanying drawing, in which:

FIG. 1 is a perspective view of an optical cable connector plug, and an optical connector receptacle in accordance with one embodiment of the invention;

FIG. 2 is an exploded view of an optical connector plug and a connector receptacle in accordance with the embodiment of the invention;

FIG. 3 is an exploded view, partly in section, of the optical connector plug; and FIG. 4 is an exploded view, partly in section, of the connector receptacle in accordance with one embodiment of the invention.

DESCRIPTION OF THE PREFERRED EMBODIMENT

The optical cable connector 10 is designed to operate with a photodetector 11 as an integral part thereof. The basic components of the optical cable connector 10 are briefly shown in FIG. 1 and are shown in greater detail in the exploded views of FIGS. 2 through 4.

The optical cable connector 10 includes a connector plug 12 and a connector receptacle 13. The fiber connector plug 12 is coupled to a fiber line 14 normally mounted at the rear of a rack which can accept a printed circuit card. The mating connector receptacle 13 houses the photodiode 11 and is normally mounted on a printed circuit board. The receptacle 13 can be mated to the connector plug 12 by the push-in action of a printed circuit card as it is inserted into the rack.

The connector plug 12 includes an optical pin 16 which is generally cylindrical in shape and has an axial passageway including a large diameter portion 17 for receiving the fiber line 14 (including outer sheath 18) and a small diameter portion 19 for receiving the fiber 21. The circumference of the pin 16 has a nominal outer diameter 22 with a medial circular flange 23.

The fiber connector plug 12 further includes a compression spring 24 having an inner diameter large enough to receive the optical pin 16 but smaller than the flange 23.

The connector plug 12 further includes a spring retainer nut 26 which has an inner passageway 27 with an inner diameter greater than the outer diameter 22 of the optical pin 16. However, the inner diameter 27 of the spring retainer nut 26 is smaller than the flange 23. The spring retainer nut 26 has an external male thread 28.

The connector plug 12 further includes an optical pin housing assembly 29 which has an axial passageway having a first end portion characterized by an internal female thread 31 adapted to engage with the external male thread 28 of the spring retainer nut 26. The axial passageway of the optical pin housing assembly 29 contains a medial portion 32 large enough to receive the optical pin 16 including its medial flange 23 for axial reciprocation therewithin. An opposing end portion 33 of the axial passageway of the optical pin housing assembly 29 has a diameter barely larger than the nominal outer diameter 22 of the optical pin 16, but is smaller than the medial circular flange 23.

The optical pin housing assembly 29 is provided with an external thread 34 so that the optical pin housing assembly 29 along with the remaining portions of the connector plug 12 can be suitably mounted onto a rack by a suitable mating nut 35 (FIG. 1), washer and lock washer (not shown).

The fiber line 14, which includes the fiber 21 and its external sheath 18 is held within the optical pin 16 with epoxy at surface points within portions 17 and 19. After curing the optical epoxy, the optical pin assembly is optically polished before installation into the optical pin-housing assembly 29.

The connector receptacle 13 includes a housing 36 generally in the form of a TO-18 can. The housing 36 includes an outer cylindrical shell 37, a flanged base 38, a photodiode chip 11 affixed to the base, electrical leads 39 extending through the base 38 to the chip 11, and a transparent light pipe 41 affixed to the chip 11 and extending axially with the shell 37. The light pipe 41 has a diameter substantially larger than the diameter of the fiber 21.

The connector receptacle 13 includes a circular shim or spacer 42 having a centrally located hole 43.

The connector receptacle 13 further includes a photodiode housing assembly 44 having an axial passageway including a medial portion 46 large enough so that the nominal outer diameter portion 22 of the optical pin 16 can reciprocate therewithin, a first tapered end portion 47 for engaging the medial portion 46, and an opposing larger end portion 48 for receiving the shim 42 and a substantial portion of the outer cylindrical shell 37 of the housing 36 but not the flanged base 38. The photodiode housing assembly 44 has an outer male thread 49.

The connector receptacle 13 includes a retainer cap 51 having an inner thread 52 adapted to engage with the outer thread 49 of the photodiode housing assembly 44. The retainer cap 51 has an inner portion or flange 53 adapted to engage with the flanged base 38 of the housing 36. The flange 38 of the housing 36 thus abuts the inner flange 53 of the retainer cap 51 and abuts the end of the photodiode housing assembly 44 and is held in place therewith by the retainer cap 51.

Thus, in operation, as shown in the figures and as illustrated above, there is described a fiber connector plug 12 with a spring loaded pin 16 coupled to a fiber line 14 normally mounted at the rear of a rack which can accept the printed circuit card. The mating connector receptacle 13 contains the photodiode 11 and is normally mounted on a printed circuit board. The receptacle 13 is mated to the plug 12 by the push-in action of a printed circuit card as it is inserted into the rack. The optical fiber pin 16 reaches its seat in the receptacle 13 slightly before the card is fully seated so that the fiber pin spring 24 remains under load. A significant advantage of this invention is that connections of a fiber to a photodetector can be achieved with losses consistently below one-half decibel, and are repeatable to ±0.1 decibel.

The photodiode housing 36 contains the light pipe 41 which is larger in diameter than the fiber 21 to be coupled, as illustrated in FIGS. 3 and 4. It can be seen that, in the case illustrated, the light pipe 41 (FIG. 4) is four times the diameter of the fiber 21 (FIG. 3). This technique, utilizing a large diameter light pipe with a narrow diameter fiber, assures relatively insensitive fiber alignment.

As shown in FIG. 2, utilizing the spacer or shim 42 in front of the photodiode housing 36, glass-to-glass contact between the fiber 21 and the light pipe 41 in the housing 36 is avoided. This invention presents a solution to the difficult problem of low loss optical fiber connection for printed circuit card implementation. By utilizing a one mil spacer between the optical pin and the light pipe, hard contact of the glass fiber against any other object is avoided.

By following the practices of this invention, an optical fiber connector contains an integral photodetector which can be applied to a push-in printed circuit board. Modifications can be performed to this invention without departing from the spirit and scope of this invention as defined by the appended claims.

What is claimed is:

1. An optical cable connector comprising:
   (a) a fiber connector plug adapted to receive an optical fiber assembly including sheath and fiber, including
      (i) a generally cylindrical optical pin having an axial passageway including a large diameter portion for receiving said fiber assembly, and a small diameter portion for receiving said fiber, said pin having a nominal outer diameter with a medial circular flange,
      (ii) a compression spring having an inner diameter large enough to receive said optical pin nominal outer diameter but smaller than said flange;
      (iii) a spring retainer nut having an inner passageway with an inner diameter greater than said nominal outer diameter, but smaller than said flange, said nut having an external male thread; and
      (iv) an optical pin housing assembly having an axial passageway, said axial passageway having a first end portion characterized by an internal female thread adapted to engage with said external male thread of said spring retainer nut, a medial portion large enough to receive said optical pin including its medial flange for axial reciprocation therewithin, and an opposing end portion having a diameter barely larger than said nominal outer diameter but smaller than said medial circular flange; and
   (b) a mating connector receptacle including
      (i) a housing including an outer cylindrical shell, a flanged base, a photodiode chip affixed to said base, electrical leads extending through said base to said chip, and a transparent light pipe affixed to said chip and extending axially with said shell, said light pipe having a diameter substantially larger than the diameter of said fiber;
      (ii) a circular shim having an outer diameter larger than said nominal outer diameter, and having a central hole smaller than said nominal outer diameter but larger than said small diameter portion;
      (iii) a photodiode housing assembly having an axial passageway including a medial portion large enough so that the nominal outer diameter portion of said pin can reciprocate therewithin, a first tapered end portion for engaging said medial portion, and an opposing larger end portion for receiving said shim and a substantial portion of said outer cylindrical shell of said housing, but not said flanged base; and having an outer thread; and
      (iv) a retainer cap having an inner thread adapted to engage with said outer thread of said photodiode housing assembly and having an inner portion adapted to engage said flanged base of said housing, whereby said receptacle is mated to said plug, as they are engaged, wherein said pin reaches its seat in said receptacle slightly before said receptacle is fully seated so that said compression spring remains under load.

2. The connector as recited in claim 1 wherein said light pipe has a diameter four times larger than the diameter of said fiber.

* * * * *